United States Patent [19]
Cipolla

[11] Patent Number: 6,028,768
[45] Date of Patent: Feb. 22, 2000

[54] MECHANISM FOR DEPLOYING A KEYBOARD FOR A PORTABLE COMPUTER

[75] Inventor: Thomas Mario Cipolla, Katonah, N.Y.

[73] Assignee: International Business Machines Corporation, Armonk, N.Y.

[21] Appl. No.: 08/902,652

[22] Filed: Jul. 30, 1997

[51] Int. Cl.[7] .............................. G06F 1/20; H05K 5/02; H05K 7/20
[52] U.S. Cl. ..................... 361/687; 361/680; 361/727; 400/682; 364/708.1
[58] Field of Search .................................. 361/680, 687; 364/708.1; 400/682, 691, 714

[56] References Cited

U.S. PATENT DOCUMENTS

| | | | |
|---|---|---|---|
| 5,168,427 | 12/1992 | Clancy et al. | 400/682 |
| 5,287,245 | 2/1994 | Lucente et al. | 361/680 |
| 5,490,036 | 2/1996 | Lin et al. | 361/680 |
| 5,490,037 | 2/1996 | Clancy | 361/680 |
| 5,534,891 | 7/1996 | Takano | 361/680 |
| 5,539,615 | 7/1996 | Sellers | 400/682 |
| 5,629,832 | 5/1997 | Sellers | 361/680 |
| 5,687,058 | 11/1997 | Roylance | 400/682 |
| 5,742,475 | 4/1998 | Riddiford | 361/680 |
| 5,754,395 | 5/1998 | Hsu et al. | 361/680 |
| 5,764,474 | 6/1998 | Youens | 361/680 |
| 5,818,360 | 10/1998 | Chu et al. | 361/680 |

OTHER PUBLICATIONS

Albert Yu, "The Future of Microprocessors", *IEEE Micro*, Dec. 1996, pp. 46–53.

*Primary Examiner*—Leo P. Picard
*Assistant Examiner*—Lisa Lea-Edmonds
*Attorney, Agent, or Firm*—Scully, Scott, Murphy & Presser; Daniel P. Morris, Esq.

[57] ABSTRACT

An arrangement and method for increasing the cooling capacity of portable personal computers, such as laptop or notebook computers, wherein the computer possesses an automatically deployable keyboard located in the bottom keyboard housing to which there is articulated an openable display unit, and wherein heat generating electronic elements, such as a processor, are located in the housing for the keyboard.

12 Claims, 5 Drawing Sheets

MECHANISM FOR DEPLOYING A KEYBOARD FOR A PORTABLE COMPUTER

BACKGROUND OF THE INVENTION

The present invention relates to an arrangement for enhancing the cooling capacity of portable personal computers. More particularly, the invention is directed to the provision of an arrangement for increasing the cooling capacity of portable personal computers, such as laptop or notebook computers, wherein the computer possesses a deployable keyboard located in the bottom keyboard housing to which there is articulated an openable display unit, and wherein heat generating electronic elements, such as a processor, are located in the housing for the keyboard.

The capacity and performance of portable personal computers, such as laptop computers, notebook computers or the like, has recently been enhanced to such an extent that; for example, since the beginning of 1996, the thermal dissipation requirements of portable personal computers (PCs) have increased from about 10 watts to 20 watts and even higher values. This increase in the thermal dissipation requirements is a result of ever increasing CPU performance and additional functionality; such as DVD, modem, audio and the like, which are provided by future PCs. As elucidated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; for instance, the cooling limit for a portable PC without a cooling fan is currently approximately 15 to 20 watts. Thus, providing a greater cooling capacity than the current limits in order to meet the anticipated thermal dissipation requirements of future portable personal computers, represents not only a potential competitive advantage in industry, but also provides a significant product differentiation from currently available commercially sold portable personal computers.

SUMMARY OF THE INVENTION

According to a first embodiment of the invention, the arrangement for enhancing the cooling capacity of the personal computer, such as a laptop computer, includes a mechanism which enhances the power dissipation of the computer by displacing the keyboard towards a user, thus permitting the components which generate the greatest amount of heat; for example, the processor which is normally located below the keyboard, to be exposed more extensively to the surroundings or ambient air, thereby facilitating an increase in the extent of cooling. In this particular embodiment, while the keyboard is displaced forwardly towards the user in order to expose a greater surface area of the computer to the ambient air and to thereby increase the cooling capacity, there is concurrently implemented a tilting of the keyboard so as to incline the latter upwardly at the end thereof which is distant from the user, thereby increasing user comfort in operating the computer.

Pursuant to a modified embodiment of the invention, the keyboard is automatically displaced toward the user by raising the display panel of the laptop computer from a closed or folded down position into an open position. In this embodiment, although the keyboard is not tilted, and does not provide the full advantage of rendering the keyboard operation more comfortable to a user, it does considerably enhance the cooling capacity of the computer. In this instance, the particular advantage which is derived is that the mechanism for deploying the keyboard forwardly upon the opening of the display panel is substantially contained between two planes that are defined by the top of the keyboard and the bottom of the keyboard, and in which no portion of the mechanism for implementing the keyboard displacement extends below the plane of the bottom of the keyboard. Inasmuch as space is at a considerable premium in portable computers, particularly such as laptop or notebook computers, this imparts a significant advantage in space savings, which can then be utilized for the installation of other electronic elements or operative components.

Accordingly, it is an object of the present invention to provide an arrangement for increasing the cooling capacity of portable personal computers, in that the bottom keyboard of a laptop computer is adapted to be automatically shifted towards a user upon the opening of a display panel, thereby increasing an exposed surface area for cooling electronic components of the computer, and concurrently tilting the keyboard upwardly to a predetermined extent so as to increase user comfort during operation of the computer.

Another object of the present invention resides in the provision of a portable personal computer such as a laptop or notebook computer, in which, upon the opening of a display panel, the keyboard of the computer is automatically shifted towards the user, thereby exposing an increased surface area for increasing the cooling capacity of the computer. The mechanism for implementing the shifting of the keyboard also is adapted to be positioned within a minimum amount of space so as to render available additional space for the installation of other electronic elements in the computer.

BRIEF DESCRIPTION OF THE DRAWINGS

Reference may now be had to the following detailed description of preferred embodiments of the invention, illustrated in the form of a laptop computer, and referring to the accompanying drawings; in which.

DETAILED DESCRIPTION OF PREFERRED EMBODIMENTS

Figure 1:
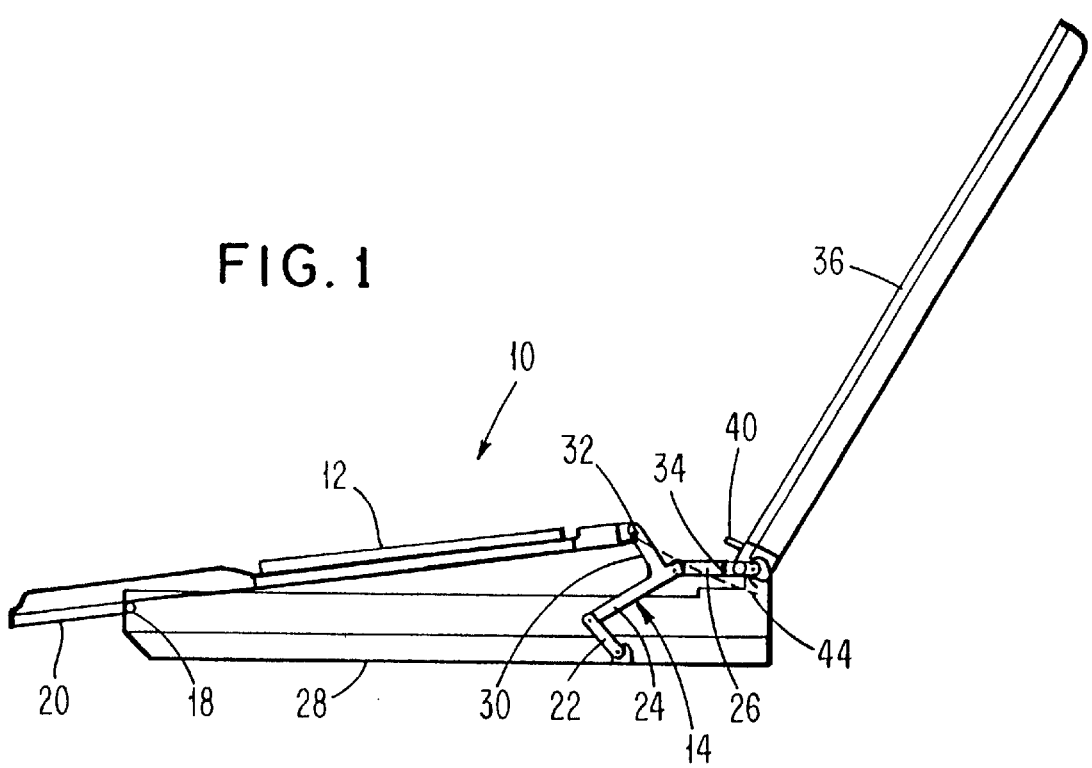
FIG. 1 illustrates, in a generally diagrammatic representation, a side view of an opened portable personal computer, such as a laptop computer, with the display panel being opened beyond 90° relative to the orientation of the main body or bottom housing of the computer containing the keyboard.

Referring to FIG. 1, a laptop computer 10 has the keyboard 12 mounted to the computer by means of two identical four-bar linkages 14, one on each side of the body 28, and two pins 18 which guide the keyboard 12 in tracks 20. The four-bar linkages 14 are each comprised of links 22, 24 and 26, and which are pivotally connected to each other and pivotally connected to the body 28 of the computer 10. Link 24 is "T" shaped with an arm 30 extending therefrom, and with the keyboard 12 being pivotally attached to the end of arm 30 through pivot point 32. The four-bar linkages 14 are operated by a torsion spring 34 which applies a biasing force on link 26 to induce the four-bar linkage 14 to deploy the keyboard 12. When the display panel 36 is in its fully opened position, as shown in FIG. 1, the keyboard 12 is held in the fully deployed position by means of stop 38 which is attached to the computer body 28. This stop 38 prevents link 26 from pivoting beyond a point where the keyboard 12 is fully deployed, and allows the display panel 36 to pivot beyond this point without effecting the position of the keyboard 12.

Another stop 40 is attached to the display panel 36. This stop 40 is positioned so as to contact link 26 when the display panel 36 pivots towards the closed position. FIG. 1 shows the display 30 in a position opened beyond 90 degrees relative to the body 28 and stop 40 has traveled beyond the contact with link 26.

Figure 2:
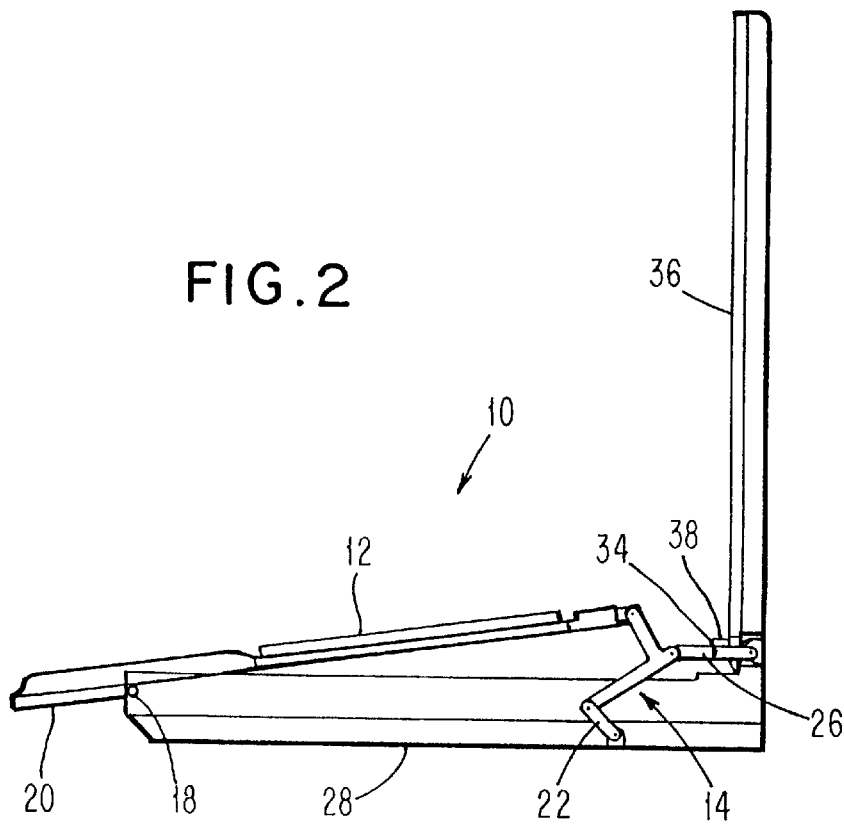
FIG. 2 illustrates a side view of the computer of FIG. 1 with the display panel shown opened 90° relative to the housing for the keyboard.
Figure 3:
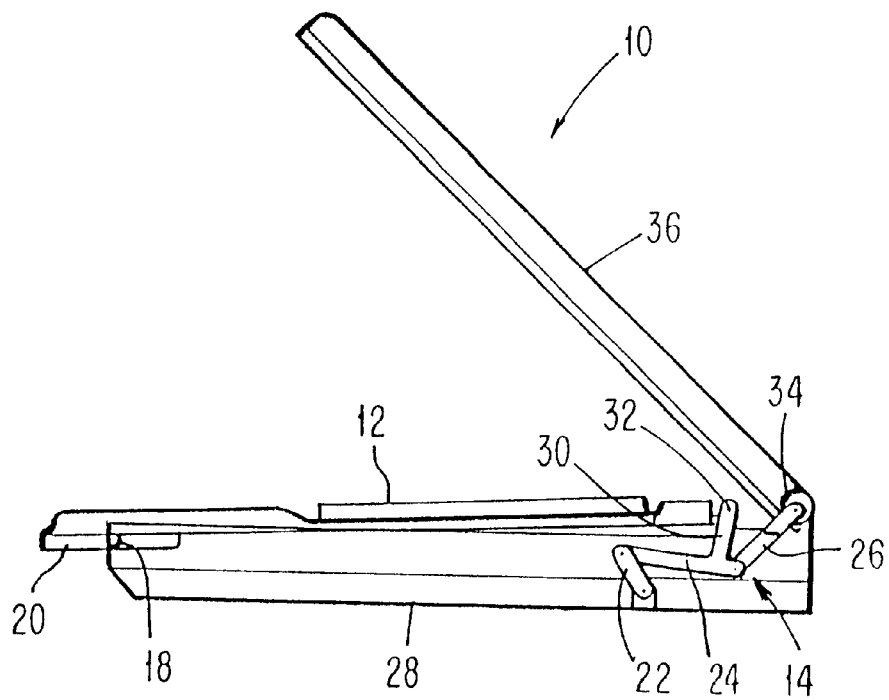
FIG. 3 illustrates a side view of the computer of FIG. 1 in only a partially opened position.
Figure 4:
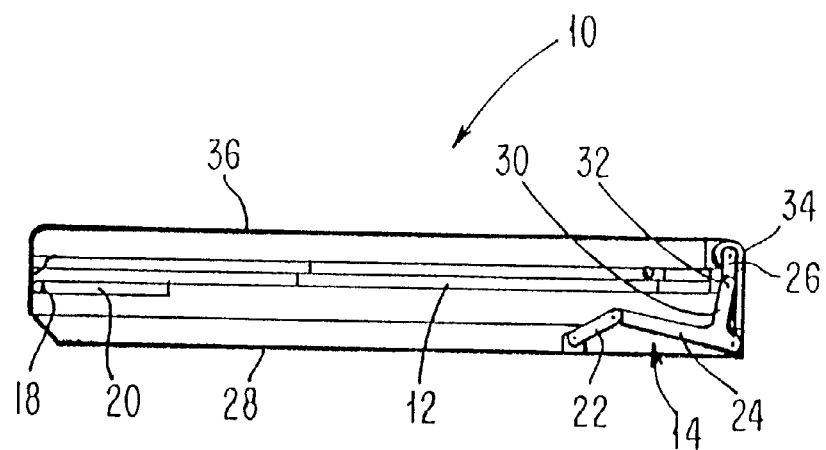
FIG. 4 illustrates a side sectional view of the computer of FIG. 1 in the fully closed position thereof.

Referring to FIG. 2, the display panel 36 is shown in the 90 degree opened position. At this point, stop 40 comes into contact with link 26. Ninety degrees was arbitrarily selected as a reasonable angle at which the keyboard 12 should be deployed, but this angle can be selected to be within several degrees on either side of 90°. Further travel of display panel 36 will cause link 26 to pivot downwardly and away from stop 38, as shown in FIG. 3. As the link 26 pivots downwardly the four-bar linkages 14 become operational. It will be obvious to those skilled in the art that the pivot point 32 on arm 30 follows a precise path. The path that the four-bar linkage mechanism 14 disclosed herein takes is shown as reference number 44 in FIG. 1. Each dot on path 44 is the position of pivot point 32 as link 26 rotates in 7.5 degree increments. It would also be obvious to those skilled in the art that the contour of this path is primarily dependent on the length of the links 22, 24 and 26, their attachment points on the body 28 and also the location of pivot point 32 relative to link 24; since in this embodiment the upper end of the keyboard 12 substantially follows path 44. It is desirable to have a path 44 such that when the display panel 36 is raised the upper end of keyboard 12 is in a forward displaced position to aid in the cooling process and concurrently tiled upwardly to allow more comfort to a user. Further, path 44 must enable the keyboard 12 to travel in such a manner that it does not interfere with other components of the computer 10 when it is displaced to a closed position, and also the end of path 44 must be such that keyboard 12 is in its final nested position within body 28 so that the computer 10 can be closed as shown in FIG. 4.

Figure 5:
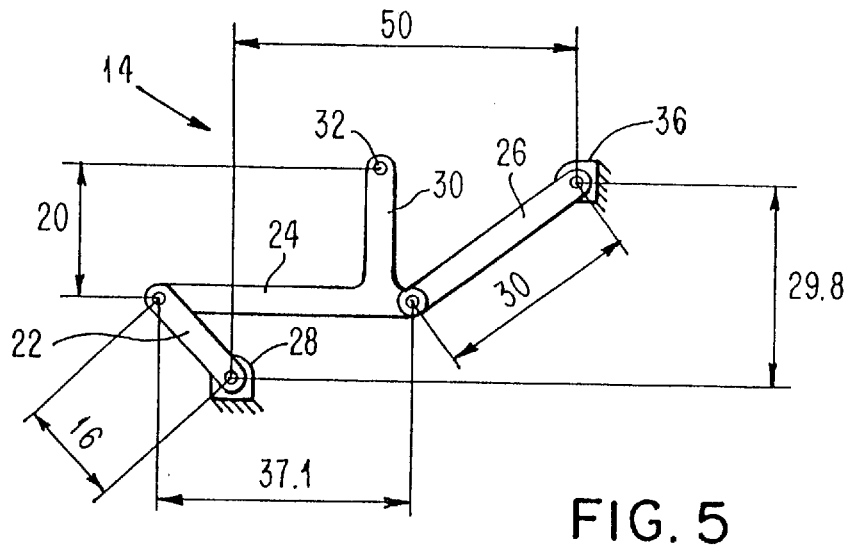
FIG. 5 illustrates a detail of a four-bar linkage utilized in connection with the operating mechanism for shifting the keyboard of the computer of FIG. 1.

The path 44 disclosed herein possesses all of these features. A four bar linkage which generates this path 44 may be achieved for use in a typical portable computer by using relative arm lengths possessing the numerical dimensions or ratios (for example, in millimeters) as shown in FIG. 5.

Considering further the operation in the deployment and nesting of the keyboard 12, the lower end of keyboard 12 is slidably mounted to computer body 28 by means of pins 18 attached to respectively the left and right sides of body 28 and tracks 20 mounted at the left and right sides of keyboard 12. Hereby, there should be noted that, alternatively, the tracks 20 could be attached to the body 28 and pins 18 can be attached to the keyboard 12.

The combination of the motion of the upper end of keyboard 12 substantially follows path 44 and the lower end thereof is guided by tracks 20 and pins 18 so that the overall motion of keyboard 12 possesses all the desirable properties of being deployed to a comfortable position of use and a position which enhances cooling of the computer components, and is foldable to a closed position when not in use.

It is highly desirable that the deploying mechanism of the keyboard 12, such as the four-bar linkage 14 disclosed herein resides within the confines of the computer 10 when the latter is in the closed position. As can be seen from FIG. 4, this condition is met through the invention.

Figure 6:
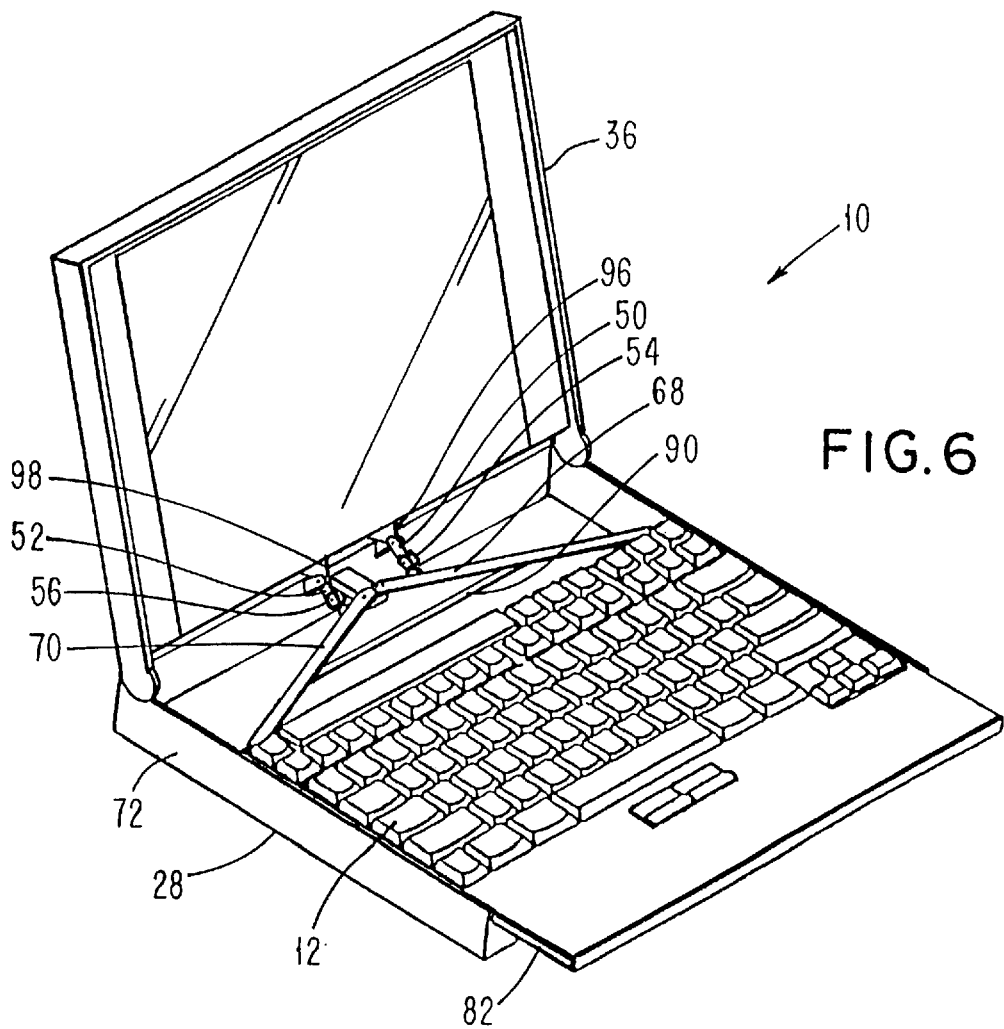
FIG. 6 illustrates a perspective view of a further embodiment of a portable personal computer, such as a laptop computer, having a slide-out keyboard, shown the fully opened condition thereof.
Figure 7:
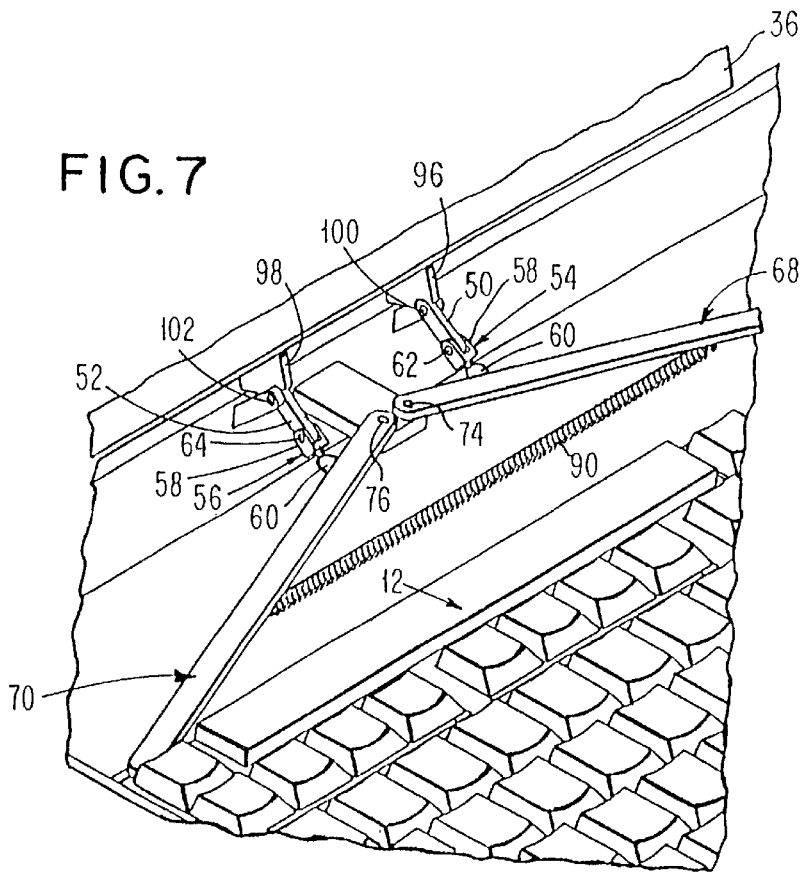
FIG. 7 illustrates, on an enlarged scale, a perspective detail view of the mechanism of FIG. 6 for operating the slide-out keyboard of the computer.
Figure 8:
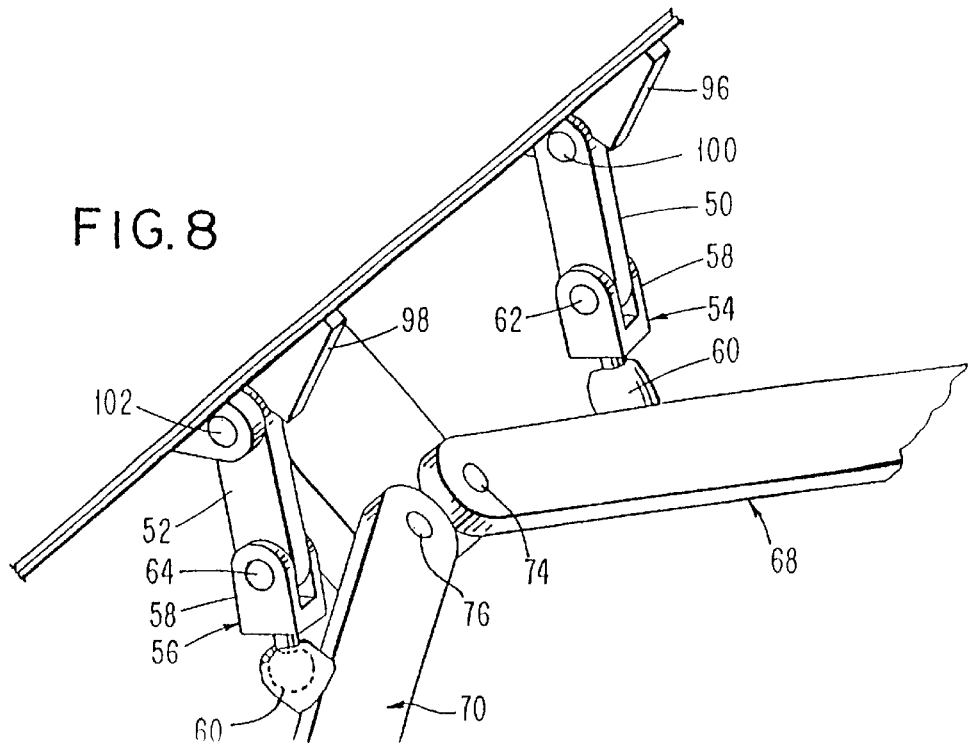
FIG. 8 illustrates, on a further enlarged scale, a perspective view of the linkage arrangement of the mechanism for operating the slide-out keyboard of FIG. 6.
Figure 9:
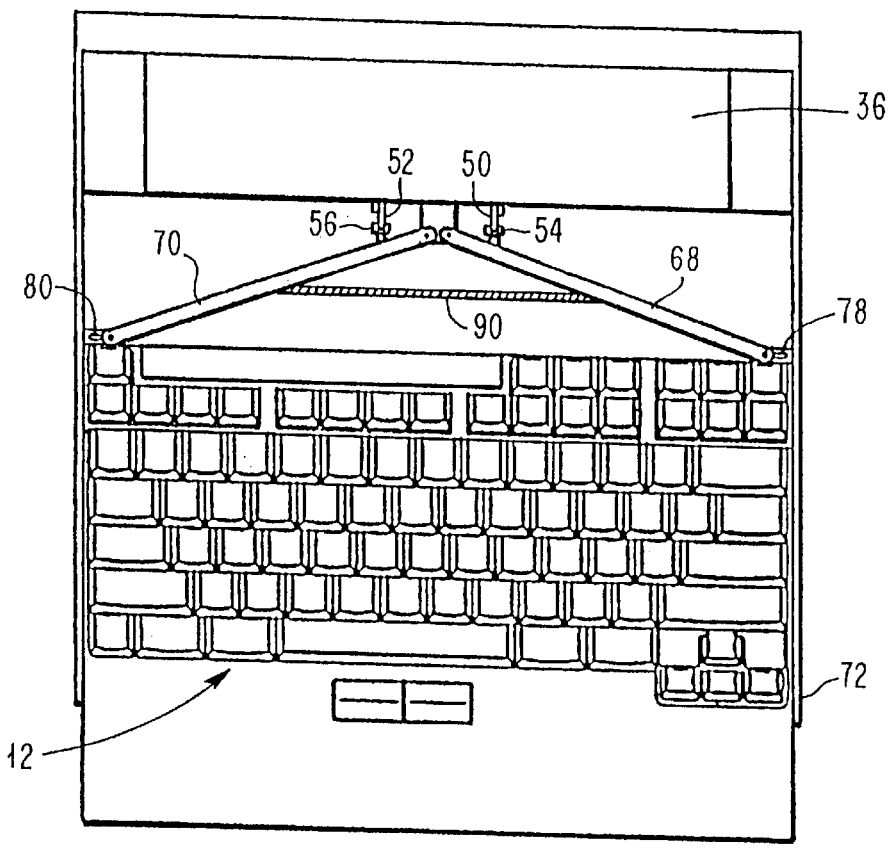
FIG. 9 illustrates a top plan view of the portable computer of FIG. 6 with the slide-out keyboard.
Figure 10:
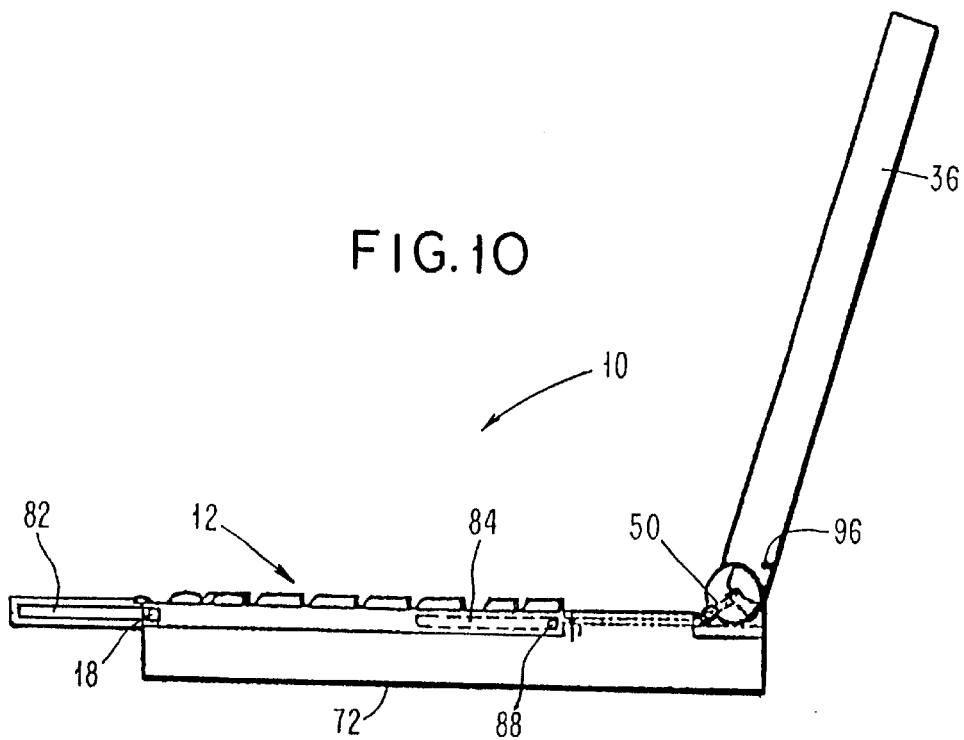
FIG. 10 illustrates a side view of the computer of FIG. 7 with the slide-out keyboard in the extended position thereof.

Referring to the embodiment of FIGS. 6 and 7, in which components similar to or identical with the previous embodiment are identified by the same reference numerals, pivot arms or links 50 and 52 pivot concentrically with the display hinge being similar to link 26 in the previous embodiment, and connected to these arms are links 54 and 56. Links 54 and 56 each have a yoke 58 at one end and a ball 60 at the other end, as shown in FIG. 8. Links 50 and 54 are pivotally attached to each other by means of a pin 62. Similarly, links 52 and 56 are pivotally attached to each other by means of a pin 64. As is shown, a slight amount of sideways rotation (approximately ±3°) is necessary between links 50 and 54 as well as between links 52 and 56. Pins 62 and 64 are sufficiently loose-fitting to facilitate this rotation. Moreover, the yoke on links 54 and 56 is wider than on links 50 and 52 to enable this motion.

Links 54 and 56 are connected to links 68 and 70, respectively. This is effected by means of a spherical end on links 54 and 56 and a socket on links 68 and 70, this being shown in FIG. 8.

Links 68 and 70 are pivotally mounted at one end to the stationary outer housing 72 proximate the center of the computer 10 by means of pins 74 and 76. The opposite ends of links 68 and 70 are connected to the keyboard 12 by means of slots 78 and 80.

The keyboard 12 has slots 82 and 84 on each side. Pins 86 and 88 protrude from the outer housing 72 towards the inside and mount the keyboard by means of slots 82 and 84. This allows the keyboard to slide forwardly by an extent conforming to the length of the slots.

When the computer 10 is open with the display panel 36 raised, a spring 90 attached to links 68 and 70 causes these links to pivot about pins 74 and 76. This motion allows the opposite ends of links 68 and 70 to push the keyboard 12 forwardly. The keyboard 12 is pushed forwardly until slots 82 and 84 bottom against pins 86 and 88, or alternately, when links 50 and 54 and links 52 and 56 reach their fully straightened out position as shown in FIG. 6. An alternative method would be to use torsion springs as in the embodiment of FIG. 1. In that case, only the slots 82 and 84 bottoming on pins 86 and 88 may be employed.

In order to fold the keyboard 12, the display panel 36 is pulled or folded down to the closed position as in an ordinary portable computer. This action enables stops 96 and 98 which are attached to the display panel to pivot around the cover hinge and contact links 50 and 52. It is noted that stops 96 and 98 do not contact links 50 and 52 until the panel 36 is within approximately 45° of being fully closed. This will allow the display panel 36 to be opened anywhere from approximately 45° to full opening (even 180°) without affecting the motion of the keyboard 12. After stops 96 and 98 have contacted links 50 and 52, further closing of the display panel 36 causes links 50 and 52 to pivot around pins 100 and 102. The other end of links 50 and 52 pull links 68 and 70 through links 54 and 56, thus pulling the keyboard into the stowed or retracted position. The ratio of the distance along link 68 or 70 from pivot pin 74 or 76 to the socket attachment point of link 54 or 56 and the total length of link 68 or 70 allows the keyboard 12 to travel much farther than the travel of link 50 or 52. In this case, the ratio is approximately 7 to 1.

The major advantage of this embodiment is that all of the mechanism takes up space only behind the rear edge of the keyboard 12, so this does not interfere with access to the sides of the computer 10 where accessories such as PCM-CIA cards are usually accessed. A minor drawback of this embodiment is that the keyboard is not tilted, so the advantage of enhanced operator comfort is not afforded.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what we claim as new, and desire to secure by Letters Patent is:

1. An arrangement for enhancing the cooling capacity of a computer having a bottom housing containing at least one electronic component generating heat during operation of said computer, a keyboard supported on said housing; and a display panel hingedly connected proximate a rear edge of said housing and being pivotable between a folded down closed position on said housing and upwardly raised open positions; said arrangement comprising actuating means, said actuating means being located within said housing rearwardly of said keyboard and connecting said keyboard and said display panel for automatically displacing said keyboard forwardly and at least partially outwardly of said housing responsive to raising of said display panel so as to provide an increased surface area for dissipating heat generated by said at least one electronic component and for retracting said keyboard within the confines of said housing upon closing said display panel into the folded down position on said housing, said keyboard being slidable within slots formed within the side edges of said housing; said actuating means comprising a pivotable linkage mechanism operatively interconnecting said display panel and the rear portion of said keyboard, said linkage mechanism including yoke structure comprising pivotable arm members having opposite ends articulated to, respectively, said display panel and to said keyboard; a pair of ball joint and clevis structures forming swivable connections which are connected to, respectively, each of said pivotable arm members, and swingable linkage elements being connected to bracket structure on said display panel; and spring means extending between said pivotable arm members to impart a biasing force thereto during displacement of said keyboard responsive to pivoting of said display panel.

2. An arrangement as claimed in claim 1, wherein track means extend along forwardly of side surfaces on said housing; and pin means on said keyboard being engageable in said track means for controlling the sliding movement of said keyboard relative to said housing.

3. An arrangement as claimed in claim 1, wherein stop means are provided for limiting the forward displacement of said keyboard with respect to said housing.

4. An arrangement as claimed in claim 1, wherein said actuating means facilitates the opening of said display panel to an angular displacement of greater than 90° relative to said housing.

5. An arrangement as claimed in claim 1, wherein stop means operatively connected with each said bracket structure and linkage elements facilitate pivotal movement of said display panel through a predetermined angular displacement prior to causing said linkage mechanism to slide said keyboard relative to said housing.

6. An arrangement as claimed in claim 1, wherein said computer comprises a laptop computer.

7. A method of enhancing the cooling capacity of a computer having a bottom housing containing at least one electronic component generating heat during operation of said computer, a keyboard supported on said housing; and a display panel hingedly connected proximate a rear edge of said housing and being pivotable between a folded down closed position on said housing and upwardly raised open positions; said method comprising connecting actuating means located within said housing rearwardly of said keyboard to said keyboard and to said display panel for automatically displacing said keyboard forwardly and at least partially outwardly of said housing responsive to raising of said display panel so as to provide an increased surface area for dissipating heat generated by said at least one electronic component and for retracting said keyboard within the confines of said housing upon closing said display panel into the folded down position on said housing, said keyboard being slidable within slots formed within the side edges of said housing; said actuating means comprising a pivotable linkage mechanism operatively interconnecting said display panel and the rear portion of said keyboard, said linkage mechanism including pivotable yoke structure comprising arm members having opposite ends articulated to, respectively, said display panel and to said keyboard; a pair of ball joint and clevis structures forming swivable connections being connected to, respectively, each of said pivotable arm members and swingable linkage elements being connected to bracket structure on said display panel; and spring means extending between said pivotable arm members to impart a biasing force thereto during displacement of said keyboard responsive to pivoting of said display panel.

8. A method as claimed in claim 7, wherein track means extend along forwardly of side surfaces on said housing; and pin means on said keyboard in said track means for controlling the sliding movement of said keyboard relative to said housing.

9. A method as claimed in claim 7, wherein stop means limit the forward displacement of said keyboard with respect to said housing.

10. A method as claimed in claim 7, wherein said actuating means facilitates the opening of said display panel to an angular displacement of greater than 90° relative to said housing.

11. A method as claimed in claim 7, wherein stop means operatively connected with each said bracket structure and linkage elements facilitate pivotal movement of said display panel through a predetermined angular displacement prior to causing said linkage mechanism to slide said keyboard relative to said housing.

12. A method as claimed in claim 7, wherein said computer comprises a laptop computer.

* * * * *